(12) United States Patent
Suzuki et al.

(10) Patent No.: US 7,612,814 B2
(45) Date of Patent: *Nov. 3, 2009

(54) OPTICAL SENSOR

(75) Inventors: Yasuhiro Suzuki, Hamamatsu (JP); Seiichiro Mizuno, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 459 days.

This patent is subject to a terminal disclaimer.

(21) Appl. No.: 10/539,067

(22) PCT Filed: Dec. 16, 2003

(86) PCT No.: PCT/JP03/16115

§ 371 (c)(1),
(2), (4) Date: Apr. 27, 2006

(87) PCT Pub. No.: WO2004/056094

PCT Pub. Date: Jul. 1, 2004

(65) Prior Publication Data

US 2006/0231748 A1 Oct. 19, 2006

(30) Foreign Application Priority Data

Dec. 16, 2002 (JP) ............................. 2002-364131

(51) Int. Cl.
H04N 5/217 (2006.01)
H04N 3/14 (2006.01)
H04N 5/335 (2006.01)

(52) U.S. Cl. .................... 348/302; 348/241; 348/294; 348/308

(58) Field of Classification Search .............. 348/241, 348/302, 308, 294
See application file for complete search history.

(56) References Cited

U.S. PATENT DOCUMENTS 4,902,886 A * 2/1990 Smisko .................. 250/214 R (Continued)

FOREIGN PATENT DOCUMENTS

CN 1357787 7/2002

(Continued)

OTHER PUBLICATIONS

Steven L. Garverick et al. "A 32-Channel Charge Readout IC for Programmable, Nonlinear Quantization of Multichannel Detector Data." *IEEE Journal of Solid-State Circuits*. vol. 30, No. 5, May 1995, pp. 533-541.

Primary Examiner—David L Ometz
Assistant Examiner—Richard M Bemben
(74) Attorney, Agent, or Firm—Drinker Biddle & Reath LLP

(57) ABSTRACT

The present invention aims at providing a photodetector capable of fast operation with inclusion of A/D converting circuits. With a photodetector 1, (K×M×N) photodiodes $PD_{k,m,n}$ are arranged in M rows and (K×N) columns in a photodetection unit 10, and processes (electric charge accumulation, CDS, filtering, and A/D conversion) regarding each of the (K×N) photodiodes $PD_{k,m,n}$ (k=1 to K, n=1 to N) of each row are carried out successively at each time T. Meanwhile, each of an electric charge accumulation operation in an integrating circuit $20_{m,n}$, a CDS operation in a CDS circuit $30_{m,n}$, a filterng operation in a filter circuit $40_{m,n}$, and an A/D conversion operation in an A/D converter $50_{m,n}$ is carried out at each time (N×T).

2 Claims, 4 Drawing Sheets

U.S. PATENT DOCUMENTS

| | | | |
|---|---|---|---|
| 5,731,578 A * | 3/1998 | Mizuno | 250/208.1 |
| 5,892,540 A * | 4/1999 | Kozlowski et al. | 348/300 |
| 6,002,435 A | 12/1999 | Yamamoto et al. | |
| 6,031,570 A * | 2/2000 | Yang et al. | 348/300 |
| 6,075,564 A * | 6/2000 | Mizuno | 348/294 |
| 6,344,877 B1 * | 2/2002 | Gowda et al. | 348/245 |
| 6,498,332 B2 * | 12/2002 | Funakoshi | 250/208.1 |
| 6,606,123 B2 * | 8/2003 | Mizuno | 348/308 |
| 6,642,501 B2 * | 11/2003 | Mizuno et al. | 250/214 R |
| 6,670,903 B2 * | 12/2003 | Fujita et al. | 341/155 |
| 6,700,110 B2 * | 3/2004 | Mizuno et al. | 250/208.1 |
| 6,757,627 B2 * | 6/2004 | Mizuno | 702/65 |
| 6,873,364 B1 * | 3/2005 | Krymski | 348/308 |
| 6,956,607 B2 * | 10/2005 | Mizuno et al. | 348/308 |
| 6,977,682 B2 * | 12/2005 | Mizuno et al. | 348/241 |
| 7,286,172 B2 * | 10/2007 | Mizuno et al. | 348/294 |
| 7,355,642 B2 * | 4/2008 | Suzuki et al. | 348/294 |
| 7,440,017 B2 * | 10/2008 | Endo et al. | 348/308 |
| 2001/0008422 A1 * | 7/2001 | Mizuno et al. | 348/302 |
| 2006/0227229 A1 * | 10/2006 | Suzuki et al. | 348/294 |

FOREIGN PATENT DOCUMENTS

| | | |
|---|---|---|
| EP | 1 081 941 | 3/2001 |
| EP | 1 206 131 | 5/2002 |
| JP | 09-051476 | 2/1997 |
| JP | 09-238286 | 9/1997 |
| JP | 09-270960 | 10/1997 |
| JP | 2000-032342 | 1/2000 |
| JP | 2000-324397 | 11/2000 |
| JP | 2002-051264 | 2/2002 |
| JP | 2002-199282 | 7/2002 |
| WO | 01/11870 | 2/2001 |

* cited by examiner

US 7,612,814 B2

OPTICAL SENSOR

TECHNICAL FIELD

The present invention relates to a photodetector including a plurality of photodiodes arranged.

BACKGROUND ART

A photodetector is an apparatus comprising a plurality of photodiodes arranged one-dimensionally or two-dimensionally, and an integrating circuit including an amplifier and an integral capacitance part and may further comprise signal processing circuits subsequent thereto (see for example, Japanese Patent Application Laid-open Gazzete No. H4-270960). With this photodetector, electric charges of amounts that are in accordance with the intensities of light made incident onto the respective photodiodes are output by the photodiodes, these electric charges are accumulated in the integrating capacitance elements, and voltages that are in accordance with the amounts of the accumulated electric charges are output from the integrating circuit. Then an A/D converting circuit converts the voltages outputted from the integrating circuit, into digital values. The photodetector is arranged to detect light incident on a photosensitive surface on which a plurality of photodiodes are arranged, based on the digital values outputted from the respective A/D converting circuits in accordance with amounts of electric charges generated in the respective photodiodes.

DISCLOSURE OF THE INVENTION

However, such a photodetector is required to improve the processing speed of the A/D converting circuits to high speed in order to implement fast photodetection, and an increase of power consumption of the A/D converting circuits will result from the fast operation of the A/D converting circuits with reduction of A/D conversion error. With integration of many A/D converting circuits, the problem of heat generation will occur with increase in the power consumption of the A/D converting circuits. Therefore, there is a limit to the fast operation of the A/D converting circuits.

The present invention has been accomplished in order to solve the above problem and an object of the invention is to provide a photodetector capable of fast operation with inclusion of A/D converting circuits.

This invention's photodetector comprises: (1) (K×M×N) photodiodes $PD_{k,m,n}$ (K being an integer of no less than 2; k being integers of no less than 1 and no more than K; M being an integer of no less than 1; m being integers of no less than 1 and no more than M; N being an integer of no less than 2; and n being integers of no less than 1 and no more than N), each generating electric charges of an amount that is in accordance with an incident light intensity; (2) (M×N) integrating circuits, one of each being provided in correspondence to K photodiodes $PD_{k,m,n}$ (k=1 to K) among the (K×M×N) photodiodes $PD_{k,m,n}$ and each successively inputting and accumulating the electric charges generated at the K photodiodes $PD_{k,m,n}$ (k=1 to K) and outputting a voltage that is in accordance with the amount of the accumulated electric charges; and (3) A/D converting circuits, each A/D converting circuit being provided in correspondence to one of said (M×N) integrating circuits, and outputting a digital value according to the voltage outputted from the corresponding integrating circuit.

With the photodetector of the present invention, for each value of m and each value of n, the electric charges that are respectively generated in accordance with the incidence of light in K photodiodes $PD_{k,m,n}$ (k=1 to K) are successively input and accumulated in a single integrating circuit and a voltage that is in accordance with the amount of the accumulated electric charges is output from the integrating circuit. Then the A/D converting circuit outputs a digital value according to the voltage outputted from the integrating circuit. Therefore, this photodetector is able to achieve fast operation.

This invention's photodetector is preferably further equipped with CDS circuits, each being arranged between an integrating circuit and an A/D converting circuit, inputting the voltage output from the integrating circuit, and outputting a voltage expressing the fluctuation of the input voltage over a fixed time. In this case, since the voltage output from each integrating circuit is input into a CDS circuit and the voltage expressing the fluctuation of the input voltage over a fixed time is output from the CDS circuit, the fluctuation of the offset of the amplifier of the integrating circuit can be eliminated by the CDS circuit.

With this invention's photodetector, the (K×M×N) photodiodes $PD_{k,m,n}$ are preferably arranged in M rows and (K×N) columns either two-dimensionally (when M=2) or one-dimensionally (when M=1), with each photodiode $PD_{k,m,n}$ being positioned at the position of the m-th row and (n+(k−1)N)-th column. In this case, the processes (electric charge accumulation and filtering, and where necessary, CDS) concerning the photodiodes can be carried out in the order of alignment in each column for each row.

BEST MODES FOR CARRYING OUT THE INVENTION

In the following, embodiments of the present invention will be explained in detail with reference to the accompanying drawings. In the explanation of the drawings, constituents identical to each other will be referred to with numerals identical to each other without repeating their overlapping descriptions.

Figure 1:
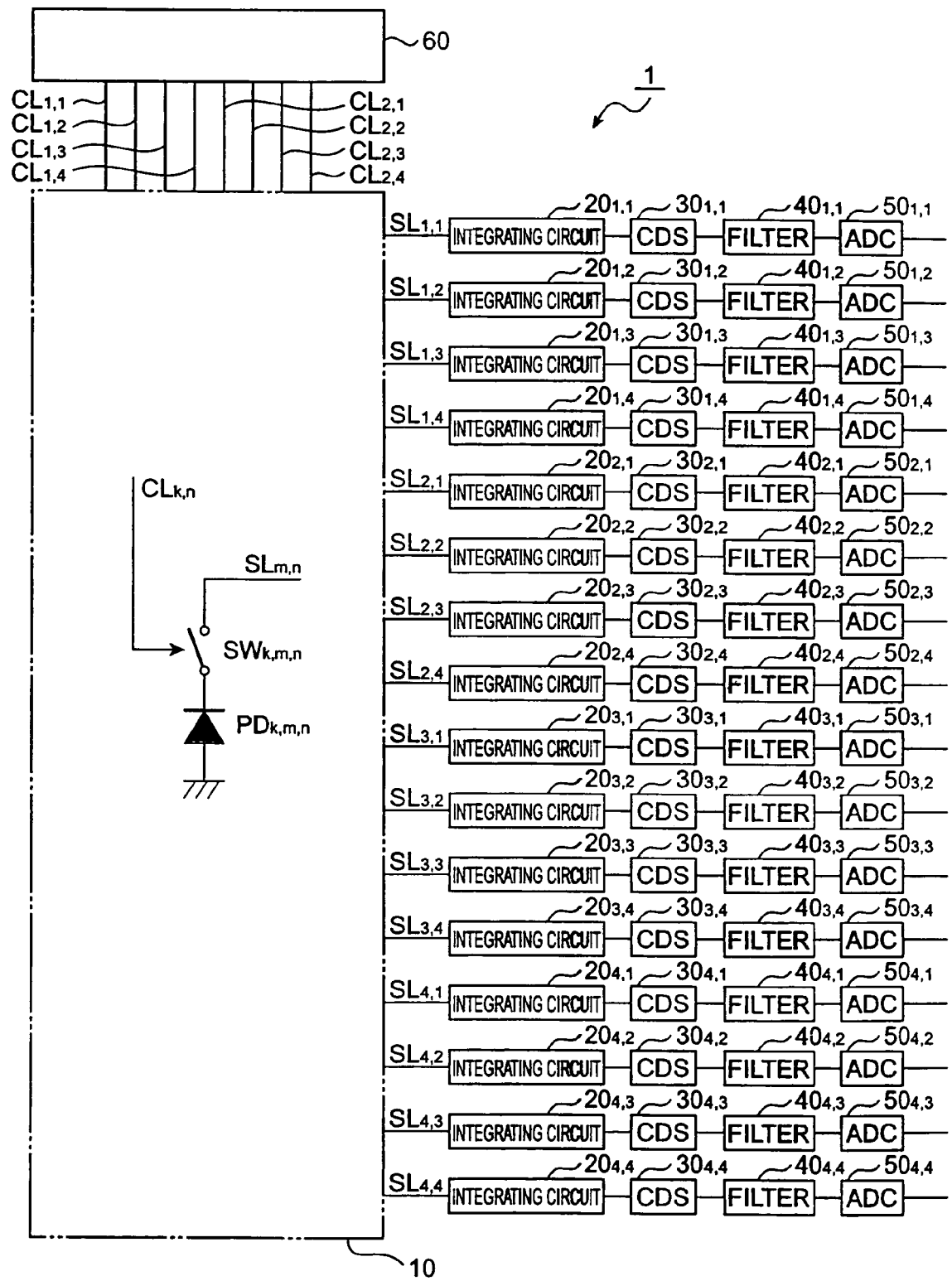
FIG. 1 is an overall diagram of a photodetector 1 in accordance with an embodiment.
Figure 2:
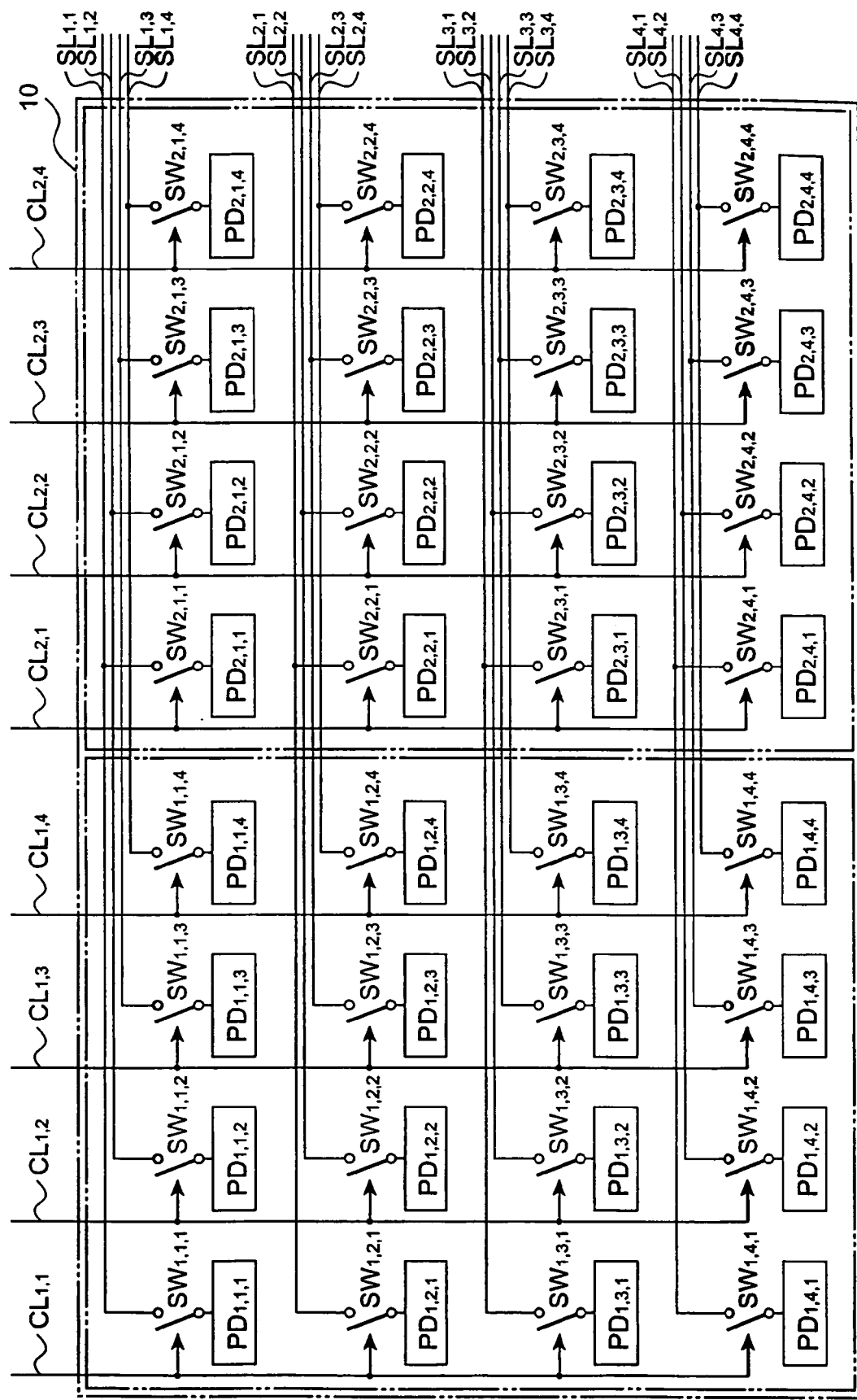
FIG. 2 is a partial diagram of the photodetector 1 in accordance with the embodiment.

FIG. 1 is an overall diagram of a photodetector 1 of the embodiment FIG. 2 is a partial diagram of photodetector 1 of the embodiment. The details of a photodetection unit 10, shown in FIG. 1 are shown in FIG. 2.

A photodetector 1, which is illustrated in these figures, is equipped with photodetection unit 10, (M×N) integrating circuits $20_{1,1}$ to $20_{M,N}$, (M×N) CDS circuits $30_{1,1}$ to $30_{M,N}$, (M×N) filter circuits $40_{1,1}$ to $40_{M,N}$, (M×N) A/D converters $50_{1,1}$ to $50_{M,N}$, and a control circuit 60. Photodetection unit 10 has (K×M×N) photodiodes $PD_{1,1,1}$ to $PD_{K,M,N}$ and (K×M×N) switches $SW_{1,1,1}$ to $SW_{K,M,N}$. Here, K indicates an integer no less than 2, M indicates an integer no less than 1, and N indicates an integer no less than 2. Also, in regard to k, m, n, which shall be used below, k indicates integers no less than 1 and no more than K, m indicates integers no less than 1 and no more than M, and n indicates integers no less than 1 and no more than N. In FIG. 1 and FIG. 2, K is set to 2 and M and N are both set to 4.

Each photodiode $PD_{k,m,n}$ generates electric charges of an amount that is in accordance with an incident light intensity and accumulates these electric charges in a junction capacitance portion. These (K×M×N) photodiodes $PD_{k,m,n}$ are arranged at equal intervals in M rows and (K×N) columns either two-dimensionally (when M=2) or one-dimensionally (when M=1). Each photodiode $PD_{k,m,n}$ is positioned at the position of the m-th row and the (n+(k−1)N)-th column. Switches $SW_{k,m,n}$ are provided in a one-to-one correspondence with respect to photodiodes $PD_{k,m,n}$ and are arranged between $PD_{k,m,n}$ and signal lines $SL_{m,n}$. Each set of K photodiodes $PD_{k,m,n}$ (k=1 to K) is connected via the corresponding switches $SW_{k,m,n}$ to a signal line $SL_{m,n}$. Each signal line $SL_{m,n}$ is connected to an input end of an integrating circuit $20_{m,n}$. The opening/closing of each set of M switches $SW_{k,m,n}$ (m=1 to M) is controlled together by a control signal output to a control line $CL_{k,n}$ from control circuit 60.

Each of integrating circuits $20_{m,n}$ is provided in correspondence to K photodiodes $PD_{k,m,n}$ (k=1 to K), inputs and accumulates the electric charges that are generated respectively at these K photodiodes $PD_{k,m,n}$ (k=1 to K) and arrive successively via switches $SW_{k,m,n}$ and signal line $SL_{m,n}$, and outputs a voltage that is in accordance with the amount of the accumulated electric charges. Each CDS (correlated double sampling) circuit $30_{m,n}$ inputs the voltage output from the corresponding integrating circuit $20_{m,n}$ and outputs a voltage expressing the fluctuation over a fixed time of this voltage.

Each filter circuit $40_{m,n}$ inputs the voltage output from the corresponding CDS circuit $30_{m,n}$, reduces the thermal noise component contained in this voltage, and outputs the voltage after reduction of the thermal noise component. Each filter circuit $40_{m,n}$ is preferably a low-pass filter with filter characteristics that can reduce thermal noise components. Each A/D converter $50_{m,n}$ inputs the voltage output from the corresponding filter circuit $40_{m,n}$, performs A/D conversion of this voltage, and outputs a digital value that is in accordance with this voltage (analog value).

Control circuit 60 outputs control signals for controlling the opening/closing of the respective (K×M×N) switches $SW_{1,1,1}$ to $SW_{K,M,N}$, to control lines $CL_{k,n}$. Control circuit 60 also controls the respective operations of integrating circuits $20_{m,n}$, CDS circuits $30_{m,n}$, and A/D converters $50_{m,n}$.

Figure 3:
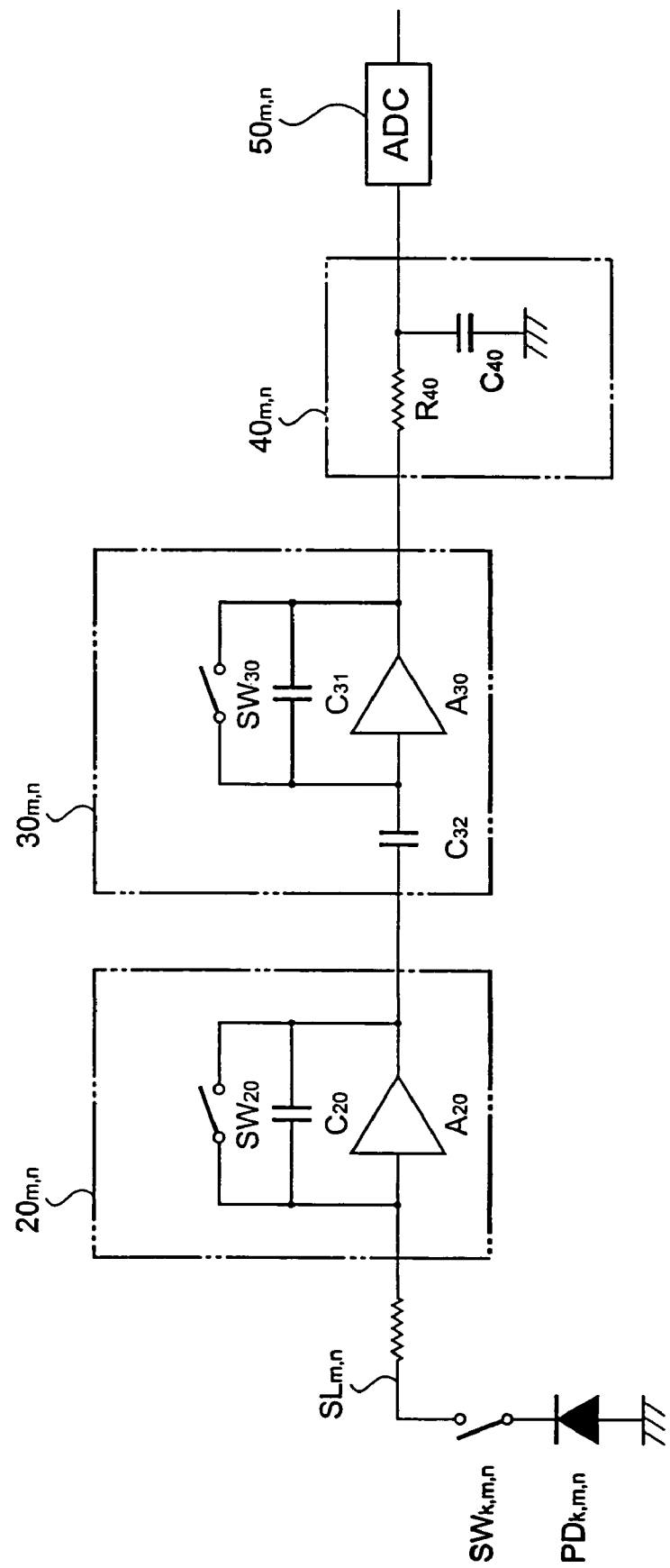
FIG. 3 is a circuit diagram of photodetector 1 of the embodiment.

FIG. 3 is a circuit diagram of photodetector 1 of the present embodiment. For the sake of simplification, just one of each of photodiodes $PD_{k,m,n}$, switches $SW_{k,m,n}$, integrating circuits $20_{m,n}$, CDS circuits $30_{m,n}$, filer circuits $40_{m,n}$, and A/D converters $50_{m,n}$ are shown in the figure.

Integrating circuit $20_{m,n}$ has an amplifier $A_{20}$, an integrating capacitance element $C_{20}$, and a switch $SW_{20}$. The input terminal of amplifier $A_{20}$ is connected to signal line $SL_{m,n}$. Integrating capacitance element $C_{20}$ and switch $SW_{20}$ are arranged in parallel between the input and output terminal of amplifier $A_{20}$. The opening/closing of switch $SW_{20}$ is controlled by control unit 60. When switch $SW_{20}$ is closed, integrating capacitance element $C_{20}$ is discharged and the voltage output from integrating circuit $20_{m,n}$ is initialized. On the other hand, when switch $SW_{20}$ is open, the electric charges arriving via signal line $SL_{m,n}$ are accumulated in the integrating capacitance element $C_{20}$ and a voltage that is in accordance with the amount of electric charges accumulated in this integrating capacitance element $C_{20}$ is output from integrating circuit $20_{m,n}$.

CDS circuit $30_{m,n}$ has an amplifier $A_{30}$, an integrating capacitance element $C_{31}$, a junction capacitance element $C_{32}$, and a switch $SW_{30}$. The input terminal of amplifier $A_{30}$ is connected via junction capacitance element $C_{32}$ to the output terminal of amplifier $A_{20}$ of integrating circuit $20_{m,n}$. Integrating capacitance element $C_{31}$ and switch $SW_{30}$ are arranged in parallel between the input and output terminals of amplifier $A_{30}$. The opening/closing of switch $SW_{30}$ is controlled by control unit 60. When switch $SW_{30}$ is closed, integrating capacitance element $C_{31}$ is discharged and the voltage output from CDS circuit $30_{m,n}$ is initialized. On the other hand, onwards from a time t at which switch $SW_{30}$ is open, electric charges corresponding to the fluctuation of the voltage output from integrating circuit $20_{m,n}$, are accumulated in integrating capacitance element $C_{31}$ and a voltage that is in accordance with the amount of electric charges accumulated in this integrating capacitance element $C_{31}$ is output from CDS circuit $30_{m,n}$.

Filter circuit $40_{m,n}$ has a resistance element $R_{40}$ and a capacitance element $C_{40}$. Resistance element $R_{40}$ is arranged between the input end and the output end of filter circuit $40_{m,n}$ and the output end thereof is connected via capacitance element $C_{40}$ to the ground potential. This filter circuit $40_{m,n}$ acts as a low-pass filter and in term of filter characteristics, the cutoff frequency thereof is in accordance with the resistance value of resistance element $R_{40}$ and the capacitance value of capacitance element $C_{40}$.

The characteristic values of the respective elements in the circuit diagram shown FIG. 3 are, for example, as follows. That is, the sum of the junction capacitance value $C_d$ of photodiode $PD_{m,n}$ and the parasitic capacitance value of signal line $SL_{m,n}$ is 220 pF and the resistance value of signal line $SL_{m,n}$ is 1 kΩ. The capacitance value $C_f$ of integrating capacitance element $C_{20}$ of integrating circuit $20_{m,n}$ is 1.25 pF, the frequency bandwidth B of amplifier $A_{20}$ of integrating circuit $20_{m,n}$ is 1 MHz, and the input transistor's transconductance $G_m$ of amplifier $A_{20}$ is 10 mS. The temperature T is 27° C. In this case, the thermal noise $V_n$ generated at amplifier $A_{20}$ of integrating circuit $20_{m,n}$ is 1210 $\mu V_{rms}$. If the capacitance value of capacitance element $C_{40}$ of filter circuit $40_{m,n}$ is 100 pF and the resistance value of resistance element $R_{40}$ of filter circuit $40_{m,n}$ is 20 kΩ, the cutoff frequency of the filter characteristics of filter circuit $40_{m,n}$ will be 0.08 MHz and the thermal noise component contained in the voltage output from filter circuit $40_{m,n}$ will be reduced to 724 $\mu V_{rms}$.

Figure 4:
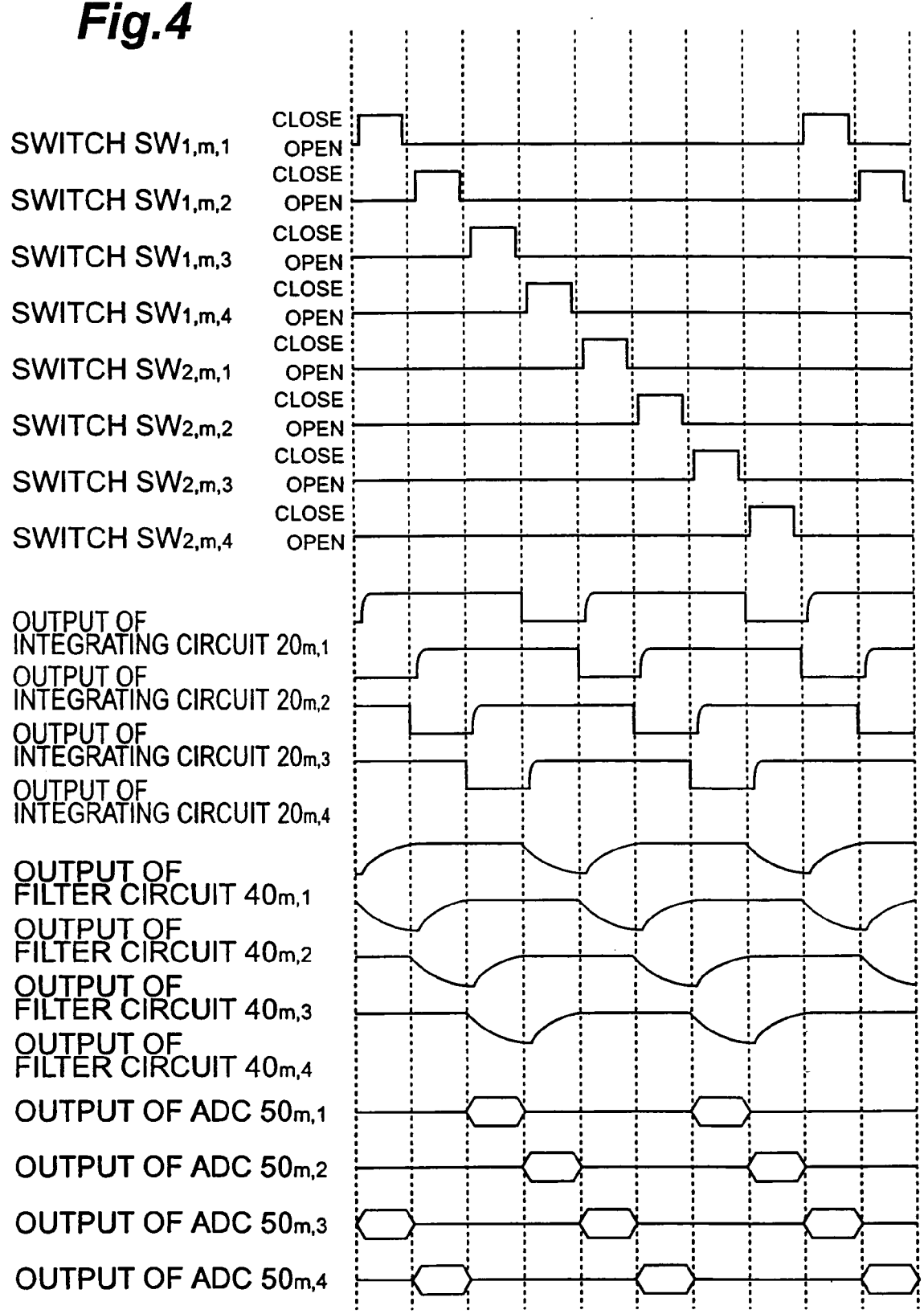
FIG. 4 is a timing chart for explaining operations of the photodetector 1 in accordance with the embodiment.

The operations of the photodetector 1 of the present embodiment shall now be described. The photodetector 1 of the present embodiment operates as described below under the control of control unit 60. FIG. 4 is timing chart illustrating the operations of photodetector 1 of the present embodiment. With this photodetector 1, the first row to the M-th row operate in parallel.

In this figure, the opening/closing of switch $SW_{1,m,1}$, the opening/closing of switch $SW_{1,m,2}$, the opening/closing of switch $SW_{1,m,3}$, the opening/closing of switch $SW_{1,m,4}$, the opening/closing of switch $SW_{2,m,1}$, the opening/closing of switch $SW_{2,m,2}$, the opening/closing of switch $SW_{2,m,3}$, and the opening/closing of switch $SW_{2,m,4}$ are shown in that order from the top. Thereafter, the output voltage of integrating circuit $20_{m,1}$, the output voltage of integrating circuit $20_{m,2}$, the output voltage of integrating circuit $20_{m,3}$, the output voltage of integrating circuit $20_{m,4}$, the output voltage of filter circuit $40_{m,1}$, the output voltage of filter circuit $40_{m,2}$, the output voltage of filter circuit $40_{m,3}$, the output voltage of filter circuit $40_{m,4}$, the output digital value of A/D converter $50_{m,1}$, the output digital value of A/D converter $50_{m,2}$, the output digital value of A/D converter $50_{m,3}$, and the output digital value of A/D converter $50_{m,4}$ are shown.

Also as shown in this figure, the operations of photodetector 1 are divided into the eight periods of $T_{1,1}$, $T_{1,2}$, $T_{1,3}$, $T_{1,4}$, $T_{2,1}$, $T_{2,2}$, $T_{2,3}$, and $T_{2,4}$ that cycle. The duration T of each of these periods $T_{k,n}$ is fixed. Switch $SW_{1,m,1}$ is closed during period $T_{1,1}$, switch $SW_{1,m,2}$ is closed dung period $T_{1,2}$, switch $SW_{1,m,3}$ is closed during period $T_{1,3}$, switch $SW_{1,m,4}$ is closed during period $T_{1,4}$, switch $SW_{2,m,1}$ is closed during pod $T_{2,1}$, switch $SW_{2,m,2}$ is closed during period $T_{2,2}$, switch $SW_{2,m,3}$ is closed during period $T_{2,3}$, and switch $SW_{2,m,4}$ is closed during period $T_{2,4}$. Subsequently, such opening and closing of the switches are repeated.

Switch $SW_{1,m,1}$ is closed during period $T_{1,1}$. Also, prior to this period $T_{1,1}$, switch $SW_{20}$ of integrating circuit $20_{m,1}$ closes once and then opens and the output voltage of integrating circuit $20_{m,1}$ is thereby initialized. When switch $SW_{1,m,1}$ closes, the electric charges generated in photodiode $PD_{1,m,1}$ and accumulated in the junction capacitance portion until then are input via switch $SW_{1,m,1}$ and signal line $SL_{m,1}$ into integrating circuit $20_{m,1}$ and become accumulated in integrating capacitance element $C_{20}$ of integrating circuit $20_{m,1}$ and a voltage that is in accordance with the amount of the accumulated electric charges is output from integrating circuit $20_{m,1}$. After period $T_{1,1}$, the output voltage of integrating circuit $20_{m,1}$ is held until period $T_{1,3}$, and when switch $SW_{20}$ of integrating circuit $20_{m,1}$ closes at period $T_{1,4}$, the output voltage of integrating circuit $20_{m,1}$ is initialized.

The output voltage of integrating circuit $20_{m,1}$ is input into CDS circuit $30_{m,1}$. From this CDS circuit $30_{m,1}$, is output a voltage that is in accordance with the amount of fluctuation of the output voltage of integrating circuit $20_{m,1}$ in the fixed duration from period $T_{1,1}$ to $T_{1,2}$. The output voltage of CDS circuit $30_{m,1}$ is input into filter circuit $40_{m,1}$ and the thermal noise component is reduced. However, due to the filter characteristics of filter circuit $40_{m,1}$, the output voltage waveform of filter circuit $40_{m,1}$ is dulled in comparison to the output voltage waveform of CDS circuit $30_{m,1}$.

At the point at which the output voltage of filter circuit $40_{m,1}$ is stable, this voltage is A/D converted by A/D converter $50_{m,1}$, and a digital value is output from A/D converter $50_{m,1}$ in period $T_{1,3}$. The digital value that is output from A/D converter $50_{m,1}$ in period $T_{1,3}$ is in accordance with the amount of electric charges that have moved from the junction capacitance portion of photodiode $PD_{1,m,1}$ to integrating capacitance element $C_{20}$ of integrating circuit $20_{m,1}$ and thus in accordance with the intensity of light incident on photodiode $PD_{1,m,1}$ in period $T_{1,1}$.

Switch $SW_{2,m,1}$ is closed dung period $T_{2,1}$. Prior to this period $T_{2,1}$, switch $SW_{20}$ of integrating dung circuit $20_{m,1}$ closes once and then opens and the output voyage of integrating circuit $20_{m,1}$ is thereby initialized. When switch $SW_{2,m,1}$ closes, the electric charges generated in photodiode $PD_{2,m,1}$ and accumulated in the junction capacitance portion until then are input via switch $SW_{2,m,1}$ and signal line $SL_{m,1}$ into integrating circuit $20_{m,1}$ and are accumulated in integrating capacitance element $C_{20}$ of integrating circuit $20_{m,1}$ and a voltage that is in accordance with the amount of the accumulated electric charges is output from integrating circuit $20_{m,1}$. After period $T_{2,1}$, the output voltage of integrating circuit $20_{m,1}$ is held until period $T_{2,3}$, and when switch $SW_{20}$ of integrating circuit $20_{m,1}$ closes at period $T_{2,4}$, the output voltage of integrating circuit $20_{m,1}$ is initialized.

The output voltage of integrating circuit $20_{m,1}$ is input into CDS circuit $30_{m,1}$. From this CDS circuit $30_{m,1}$ is output a voltage that is in accordance with the amount of fluctuation of the output voltage of integrating circuit $20_{m,1}$ in the fixed duration from period $T_{2,1}$ to $T_{2,2}$. The output voltage of CDS circuit $30_{m,1}$ is input into filter circuit $40_{m,1}$ and the thermal noise component is reduced. However, due to the filter characteristics of filter circuit $40_{m,1}$, the output voltage waveform of filter circuit $40_{m,1}$ is dulled in comparison to the output voltage waveform of CDS circuit $30_{m,1}$.

At the point at which the output voltage of filter circuit $40_{m,1}$ is stable, this voltage is A/D converted by A/D converter $50_{m,1}$, and a digital value is output from A/D converter $50_{m,1}$ in period $T_{2,3}$. The digital value that is output from A/D converter $50_{m,1}$ in period $T_{2,3}$ is in accordance with the amount of electric charges that have moved from the junction capacitance portion of photodiode $PD_{2,m,1}$ to integrating capacitance element $C_{20}$ of integrating circuit $20_{m,1}$ and thus in accordance with the intensity of light incident on photodiode $PD_{2,m,1}$ in period $T_{2,1}$.

In the above, the operations of switch $SW_{1,m,1}$, switch $SW_{2,m,1}$, integrating circuit $20_{m,1}$, CDS circuit $30_{m,1}$, filter circuit $40_{m,1}$, and A/D converter $50_{m,1}$, that is, the operations in the case where n is 1 was described. For n=2 to 4, the same rations are carried out with the timing of the operations being shifted.

A digital value that is in accordance with the intensity of light incident on photodiode $PD_{1,m,1}$ is thus output in period $T_{1,3}$, a digital value that is in accordance with the intensity of light incident on photodiode $PD_{1,m,2}$ is output in period $T_{1,4}$, a digital value that is in accordance with the intensity of light incident on photodiode $PD_{1,m,3}$ is output in period $T_{2,1}$, a digital value that is in accordance with the intensity of light incident on photodiode $PD_{1,m,4}$ is output in period $T_{2,2}$, a digital value that is in accordance with the intensity of light incident on photodiode $PD_{2,m,1}$ is output in period $T_{2,3}$, a digital value that is in accordance with the intensity of light incident on photodiode $PD_{2,m,2}$ is output in period $T_{2,4}$, a digital value that is in accordance with the intensity of light incident on photodiode $PD_{2,m,3}$ is output in the subsequent period $T_{1,1}$, and a digital value that is in accordance with the intensity of light incident on photodiode $PD_{2,m,4}$ is output in period $T_{1,2}$.

As described above, with photodetector 1 of the present embodiment, (K×M×N) photodiodes $PD_{k,m,n}$ are arranged in M rows and (K×N) columns in photodetection unit 10, and processes (electric charge accumulation, CDS, filtering, and A/D conversion) regarding the (K×N) photodiodes $PD_{k,m,n}$ (k=1 to K, n=1 to N) of each row are carried out successively at each time T. Meanwhile, each of the electric charge accumulation operation in integrating circuit $20_{m,n}$, the CDS operation in CDS circuit $30_{m,n}$, the filtering operation in filter circuit $40_{m,n}$, and the A/D conversion operation in A/D converter $50_{m,n}$ is carried out at each time N×T).

In the photodetector 1 of the present embodiment, each A/D converting circuit $50_{m,n}$ is arranged to perform the processing at intervals of the time (N×T) only, which moderates the demand for fast processing on the A/D converting circuit $50_{m,n}$ and thus suppresses increase of power consumption in the A/D converting circuit $50_{m,n}$.

The filter circuit $40_{m,n}$ reduces the thermal noise component included in the voltage outputted from the integrating circuit $20_{m,n}$. Although the voltage waveform from the filter circuit $40_{m,n}$ becomes duller, the operation from the charge accumulation in the integrating circuit $20_{m,n}$ to the A/D conversion in the A/D converting circuit $50_{m,n}$ is performed at intervals of the time (N×T), and the A/D converting circuit $50_{m,n}$ performs the A/D conversion at the point of time when the voltage from the filter circuit $40_{m,n}$ becomes stable. Therefore, this photodetector 1 is able to improve the S/N ratio of photodetection while maintaining the fast operation of photodetector. Since the improvement in the S/N to of photodetection is achieved without increase in the transconductance $G_m$ of the input transistor of the amplifier $A_{20}$ in the integrating circuit $20_{m,n}$, an increase is suppressed in the power consumption of the amplifier $A_{20}$, and the problem of heat generation is also reduced in this respect.

Also, since by the provision of CDS circuit $30_{m,n}$, the offset fluctuation of amplifier $A_{20}$ of integrating circuit $20_{m,n}$ is eliminate by CDS circuit $30_{m,n}$, the S/N ratio of photodetection is improved from this point as well. Though CDS circuit $30_{m,n}$ also contains amplifier $A_{30}$, the thermal noise generated at this amplifier $A_{30}$ is minute in comparison to the thermal noise generated at amplifier $A_{20}$ included in integrating circuit $20_{m,n}$.

Furthermore, since (K×M×N) photodiodes $PD_{k,m,n}$ are ranged in M rows and (K×N) columns, each photodiode $PD_{k,m,n}$ is positioned at the position of the m-th row and the (n+k−1)N-th column, and the processes (electric charge accumulation, CDS, filtering, and A/D conversion) regarding photodiodes $PD_{k,m,n}$ are carried out in the order of alignment in each column for each row, the storage and image processing of the photodetection data obtained by the photodetector 1 are facilitated.

INDUSTRIAL APPLICABILITY

As has been described in detail above, with the photodetector of the present invention, for each value of m and each value of n, the electric charges that are respectively generated in accordance with the incidence of light in K photodiodes $PD_{k,m,n}$ (k=1 to K) are successively input and accumulated in a single integrating circuit and a voltage that is in accordance with the amount of the accumulated electric charges is output from the integrating circuit. Then the A/D converting circuit outputs a digital value according to the voltage outputted from the integrating circuit. Therefore, this photodetector is able to perform fast operation.

The invention claimed is:

1. A photodetector comprising:
(K×M×N) photodiodes $PD_{k,m,n}$ (K being an integer of no less than 2; k being integers of no less than 1 and no more than K; M being an integer of no less than 1; m being integers of no less than 1 and no more than M; N being an integer of no less than 2; and n being integers of no less than 1 and no more than N), each generating an electric charge by an amount corresponding to an intensity of light incident thereon;
(M×N) integrating circuits, one of each being provided in correspondence to K photo diodes $PD_{k,m,n}$ (k=1 to K) among the (K×M×N) photodiodes $PD_{k,m,n}$ and each successively inputting and accumulating the electric charges generated at the K photodiodes $PD_{k,m,n}$ (k=1 to K) and outputting a voltage that is in accordance with the amount of the accumulated electric charges; and
A/D converting circuits, each A/D converting circuit being provided in correspondence to one of said (M×N) integrating circuits, and outputting a digital value according to the voltage outputted from the corresponding integrating circuit,
wherein the (K×M×N) photodiodes $PD_{k,m,n}$ are arranged in M rows and (K×N) columns either two-dimensionally (when M=2) or one-dimensionally (when M=1), with each photodiode $PD_{k,m,n}$ being positioned at the position of the m-th row and (n+(k−1)N)-th column,
switches $SW_{k,m,n}$ are provided in a one-to-one correspondence with respect to photodiodes $PD_{k,m,n}$ and are arranged between the photodiodes $PD_{k,m,n}$ and signal lines $SL_{m,n}$,
each set of K photodiodes $PD_{k,m,n}$ (k=1 to K) is connected via the corresponding switches $SW_{k,m,n}$ to a signal line $SL_{m,n}$,
each signal line $SL_{m,n}$ is connected to an input end of an integrating circuit, and
switches $SW_{k,m,n}$ on the same row are connected to the same control line $CL_{k,n}$, and the opening/closing of each row of switches $SW_{k,m,n}$ is controlled together by a control signal that is transmitted via the control line $CL_{k,n}$.

2. The photodetector according to claim 1, further comprising CDS circuits, each being arranged between said integrating circuit and said A/D converting circuit, inputting the voltage output from the integrating circuit, and outputting a voltage expressing the fluctuation of the input voltage over a fixed time.

* * * * *